Figure 1:
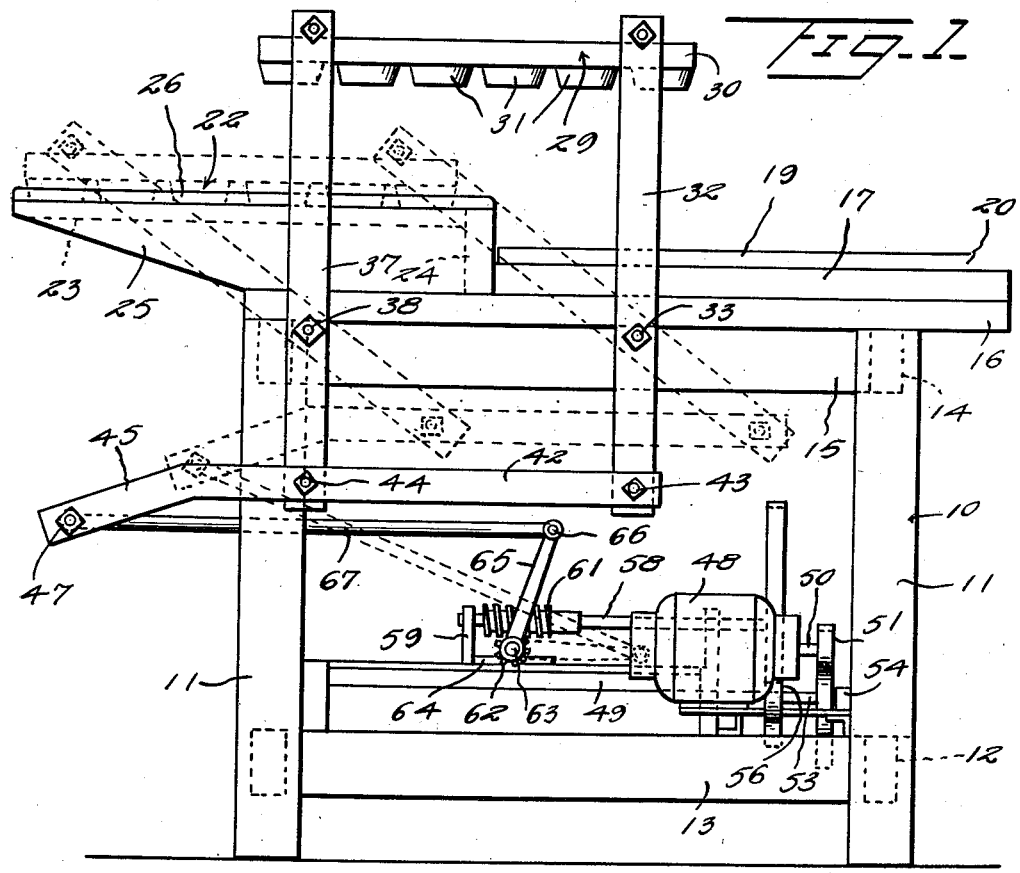

April 20, 1943.　　　　　D. E. WALTER　　　　　2,317,316
BUN PRESSING MACHINE
Filed Nov. 26, 1941　　　　　2 Sheets-Sheet 1

Inventor
D. E. Walter
By Kimmel & Crowell
Attorneys

April 20, 1943.  D. E. WALTER  2,317,316
BUN PRESSING MACHINE
Filed Nov. 26, 1941   2 Sheets-Sheet 2
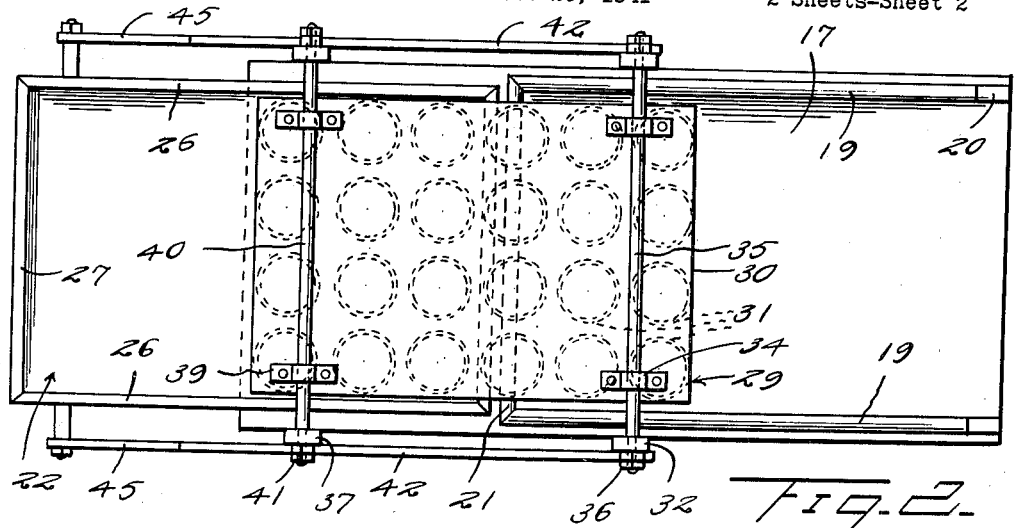
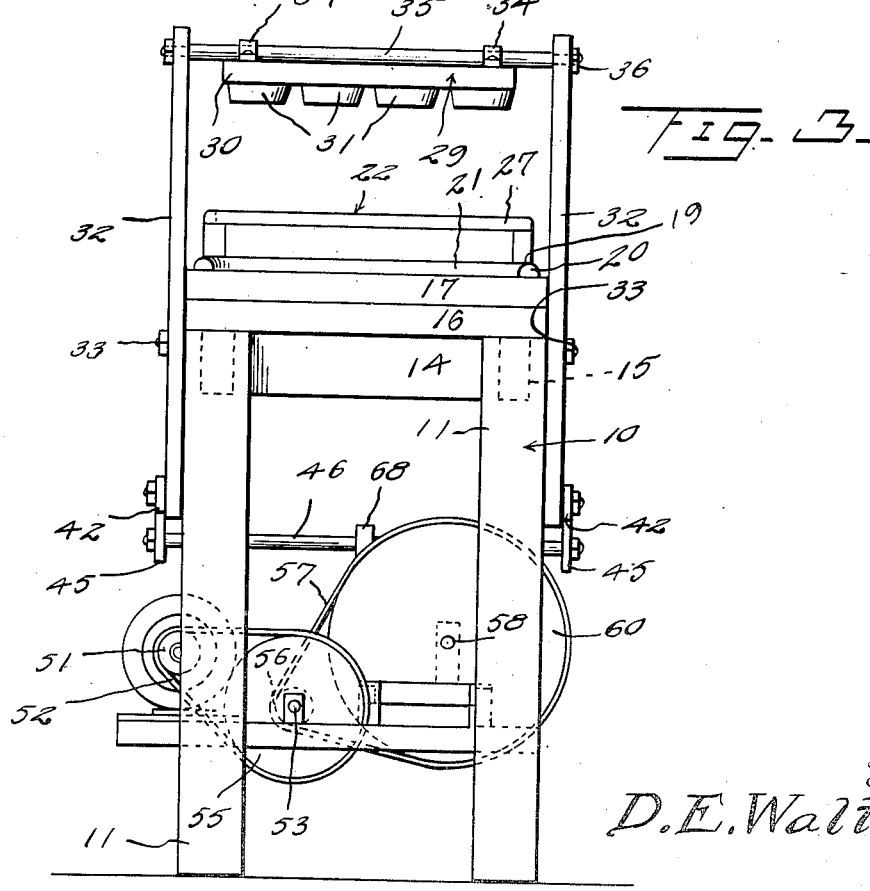
Inventor
D. E. Walter
By Kimmel & Crowell
Attorneys Patented Apr. 20, 1943

2,317,316

UNITED STATES PATENT OFFICE 2,317,316

BUN PRESSING MACHINE

Dorsey Edwin Walter, Sedalia, Mo.

Application November 26, 1941, Serial No. 420,565

3 Claims. (Cl. 107—15)

This invention relates to bun pressing machines.

An object of this invention is to provide a machine whereby buns disposed in a baking pan may be compressed to the desired degree.

Another object of this invention is to provide a machine of this kind which is provided with an oscillating pressing means adapted in one position thereof to engage a flour receptacle or holder, and in another position thereof to press down on buns which are placed in a baking pan.

A further object of this invention is to provide a machine of this kind which can be easily and cheaply manufactured and which embodies a relatively small number of moving parts which can be constructed in such a manner as not to get out of order.

A further object of this invention is to provide a machine of this kind which is so constructed that a pan of buns may be easily and quickly inserted in the pressing portion of the machine, so that the machine may be continuously operated and a new pan of buns inserted in the forward or pressing portion thereof while the pressing element is on its coating cycle.

To the foregoing objects and others which may hereinafter appear, the invention consists of the novel construction, combination and arrangement of parts as will be more specifically referred to and illustrated in the accompanying drawings, but it is to be understood that changes, variations and modifications may be resorted to which fall within the scope of the invention as claimed.

Figure 2:
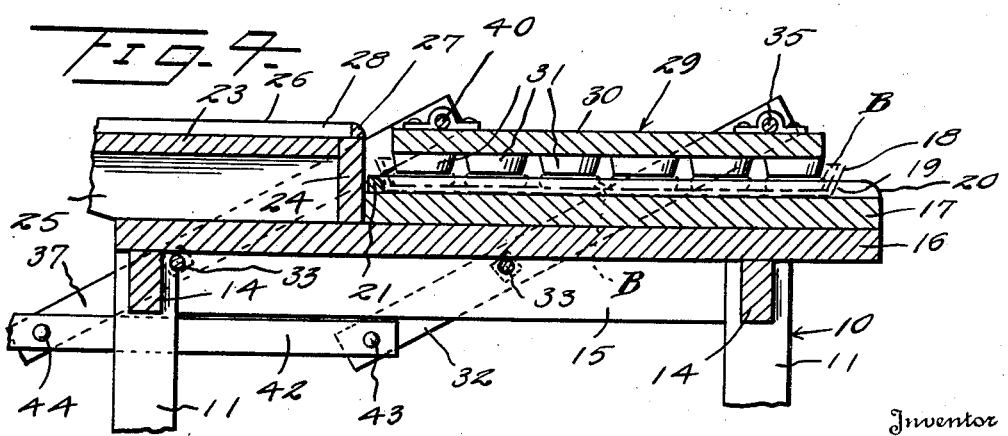

In the drawings:

Figure 1 is a detail side elevation of a bun pressing machine constructed according to an embodiment of this invention, Figure 2 is a detail top plan of the machine, Figure 3 is a detail end elevation of the machine, and Figure 4 is a fragmentary vertical section of the machine with the pressing element in bun pressing position.

Referring to the drawings the numeral 10 designates generally a frame structure including a plurality of uprights or posts 11 which are connected together adjacent their lower portions by horizontal end frame members 12 and horizontal side frame members 13. The uprights 11 are connected together adjacent the upper end portions thereof by end frame members 14 and horizontal side frame members 15. The frame structure 10 also includes a horizontally disposed table 16 which is secured in any suitable manner to the upper end of the frame 10.

The table 16 at one end thereof projects slightly beyond the end of the frame 10, and the table 16 has mounted on the upper surface thereof a plate 17 which is adapted to provide a support for a bun pan 18. In order to provide a means whereby the pan 18 may be held against lateral shifting, and to guide the pan 18 as it is moved horizontally over the plate 17, I have provided a pair of upstanding ribs or beads 19 which are fixed to the upper side of the plate 18. The forward ends of the ribs or beads 19 are beveled off as at 20, so as to facilitate the sliding movement of the pan on the plate 17, in the event one edge of the pan extends over the adjacent rib 19 due to the misplacement of the pan on the plate 17.

In practice, the pan 18 is slightly less in width than the distance between the two parallel ribs or beads 19. A rear end rib or bead 21 is also secured to the upper side of the plate 17 adjacent the rear end thereof, and provides a means for limiting the extension or movement of the pan 18 on the plate 17. When the pan 18 engages the rib or bead 21, the pan 18 will be in a pressing position whereby the buns disposed therein may be compressed to the desired degree, as will be hereinafter described.

A flour receptacle or platform generally designated as 22 is disposed rearwardly and in upwardly offset relation to the pressing table or plate 17. The flour receptacle 22 comprises a horizontally disposed base plate 23 which has secured to the forward end portion thereof a vertically disposed and transversely extending front wall or support 24. A pair of side supporting members 25 are secured to the opposite sides of the plate or base 23, and also engage against the opposite end portions of the transverse support 24. The base or plate 23 has secured to the upper side thereof a pair of upstanding side parallel beads 26 and a pair of upstanding end beads or ribs 27 thereby forming an upwardly opening chamber 28 within which flour is adapted to be positioned for coating the lower faces of the bun pressing elements as will be hereinafter described.

A bun pressing member generally designated as 29 is movably supported with respect to the bun table 17 and the flour receptacle 22. The bun pressing member 29 comprises a horizontal flat plate 30 which has fixed to the under side thereof a plurality of depending bun pressing members 31 which are disposed transversely across the side of the plate or support 30 and are also disposed in longitudinally spaced relation to each other along the length of the plate 30. The plate 30 is movably supported by means of a pair of rockable front levers 32 which are mounted on a horizontally disposed shaft 33 fixed beneath the table 16 and extending through the side frame members 15. The upper side of the plate 30 has mounted thereon a pair of spaced apart bearings 34 through which a front presser supporting shaft 35 rockably engages. The opposite end portions of the shaft 35 are rockably secured through the upper end portions of the levers or arms 32. Nuts or fastening elements 36 engage the opposite ends of the shaft 35 so as to hold this shaft against endwise movement with respect to the arms 32.

A second or rear pair of rockable arms or levers 37 are rockably mounted on a horizontally disposed shaft 38 which is extended through the side frame members 15. The upper side of the bun pressing member 29 has secured thereto a rear pair of bearings 39 through which a rear supporting shaft 40 rockably engages. The opposite ends of the shaft 40 are journalled through the upper end portions of the arms 37 and the shaft 40 is held against endwise movement by means of nuts or fastening members 41.

The pairs of supporting arms or levers 32 and 37 are extended below the shafts 33 and 38 respectively, and have pivotally secured to the lower ends thereof lever tie bars 42. The tie bars 42 are disposed in a horizontal position and at their forward ends are secured to the lower ends of the levers or arms 32 by fastening means 43. The tie bars 42 are secured to the lower end portions of the levers or arms 37 by fastening means 44. The rear end portions of the tie bars or rods 44 are bent downwardly at an obtuse angle as at 45, and a transversely disposed shaft 46 is journalled in the lower rear end portions of the obtuse extensions 45. The shaft 45 is held against endwise movement with respect to the extensions 45 by fastening devices 47.

In order to provide a means whereby the levers or arms 32 and 37 may be rocked forwardly and rearwardly, I have provided a power member 48 in the form of an electric motor which is supported on a supporting frame structure 49. The shaft 50 of the motor 48 has secured thereto a relatively small pulley about which a belt 52 is trained. A countershaft 53 is rotatably carried by the supporting frame 49 being journalled in bearings 54 carried by the frame 49.

A relatively large pulley 55 is fixed to the countershaft 53, and the belt 52 is trained about the pulley 55. A small pulley 56 is also fixed to the countershaft 53 rearwardly from the pulley 55 and a belt or flexible drive member 57 is trained about the small pulley 56. A second shaft 58 is journalled in bearings 59 carried by the frame 48 and has fixed thereto a large pulley 60. By means of the gear train hereinbefore described, the shaft 58 is adapted to turn at the desired slow speed. The shaft 58 adjacent the rear portion thereof has fixed thereto a worm 61. The worm 61 meshes with a worm gear 62 which is carried by a transversely disposed shaft 63. The shaft 63 is journalled in a bearing 64 carried by the frame 49 below the shaft 58.

A crank arm 65 is fixed at one end to the worm gear shaft 63 and the opposite end of the crank 65 is pivotally secured as at 66 to the front end of a pitman 67. The rear end of the pitman 67 is mounted on the shaft 46 as at 68, so that rotation of the crank 65 will effect oscillation or movement back and forth of the levers 32 and 37, and provide for the movement of the pressing member 29 from the flour receptacle or coating member 22 to the pressing table 17, and then back to the coating table 22.

In the use and operation of this device the buns B are initially placed within the pan 18 in spaced apart relation and in spaced rows. The pan 18 is then moved rearwardly on the table or support 17. The motor 48 is operated in the usual manner, and when the bun pressing member 29 is in its rearmost position or coating cycle, the bun engaging members 31 will press on the flour disposed in the flour chamber 28 thereby coating the lower sides of the pressing members 31. The bun pressing member 29 is then moved upwardly and forwardly and then downwardly to the position shown in Figure 4 wherein the bun engaging members 31 will contact the buns B and compress these buns within the pan 18. The bun engaging members 31 may be either smooth or their lower faces may be provided with suitable indicia or other designs which are to be impressed in the upper sides of the buns B. After the crank 65 moves the bun pressing member 29 to the pressing position which is shown in Figure 4, the continued rotation of the crank 65 will then return the bun pressing member 29 to the flour or coating receptacle 28 where the cycle will be repeated. Upon return of the pressing member 29 to a bun pressing position, a new pan of buns is inserted on the table 17 between the guides 19 and to the limit permitted by the stop flange or bead 21.

The use of this machine will eliminate the necessity for hand pressing or compressing the buns after they have been placed in the pan, and will provide for an even compressing of the buns which is not obtainable through a hand operation. Furthermore, with a machine of this kind the dough pieces which are of equal size are not only compressed to the desired degree so that they are of equal height but in the compressing operation the dough pieces will spread laterally to an even degree so that they will be of equal diameter or size.

What I claim is:

1. A bun pressing machine comprising a frame, a pan supporting member carried by said frame, an upwardly opening flour receptacle carried by said frame rearwardly of said pan supporting member, means supporting said receptacle in upwardly offset relation with respect to said pan supporting member, a bun pressing member including a horizontally disposed plate and a plurality of spaced apart bun engaging members secured to and depending from the lower side of said plate, means supporting said bun pressing member for movement from a coating position engaging within said receptacle to a pressing position over said pan supporting member, said latter means including opposed pairs of levers pivotally secured intermediate the ends thereof to said frame, a pair of tie bars pivotally secured to the lower ends of the levers and extending rearwardly therefrom, a shaft connecting the rear ends of said tie bars together, a link connected at one end to said shaft, and means connected to the opposite end of said link for oscillating said link.

2. A bun pressing machine comprising a frame, a pan supporting member carried by said frame, said supporting member including forwardly opening guide means, an upwardly opening flour receptacle carried by said frame rearwardly of said pan supporting member, a bun pressing member including a horizontally disposed plate and a plurality of depending bun engaging members carried by the lower side of said plate, a front pair of rock members carried by said frame and extending upwardly therefrom, a rear pair of rock members pivotally carried by said frame and extending upwardly therefrom, means pivotally securing said levers to said plate whereby said plate will be maintained in a horizontal position within said receptacle and over said pan supporting member, and means engaging the lower ends of said rock members for swinging the latter to thereby move said bun pressing member from a coating position engaging within said receptacle to a pressing position engaging over said pan supporting member.

3. A bun pressing machine comprising a frame, a pan supporting member carried by said frame, an upwardly opening flour receptacle carried by said frame rearwardly of said pan supporting member, a bun pressing member including a horizontally disposed plate and a plurality of depending bun engaging members fixed to the lower side of said plate, a front pair of rock levers, means pivotally securing said levers to said frame whereby a portion of each lever will be disposed in upwardly extending position with respect to said frame, a rear pair of rock levers, means pivotally securing said rear pair of rock levers to said frame whereby a portion of said rear pair of levers will be disposed in upwardly extended position with respect to said frame, a front shaft connected at the opposite ends thereof to the upper ends of said front pair of rock levers, means pivotally securing said front shaft to the upper side of said plate, a rear shaft, means securing the opposite ends of said rear shaft to the upper end portions of said rear levers, means pivotally securing said rear shaft to the upper side of said plate rearwardly of said first shaft, a pair of horizontally disposed tie members connected to the lower ends of said rock levers and extending rearwardly therefrom, a shaft extending between the rear ends of said tie members, a rotatable crank, means for rotating said crank, and means connecting said crank with said latter shaft whereby rotation of said crank will effect movement of said bun pressing member from a coating position within said receptacle to a pressing position engaging over said pan supporting member.

DORSEY EDWIN WALTER.